Feb. 9, 1937.  W. J. PASINSKI  2,070,063
CASH REGISTER
Filed Sept. 15, 1933   5 Sheets-Sheet 1

INVENTOR
Walter J. Pasinski
BY
ATTORNEYS

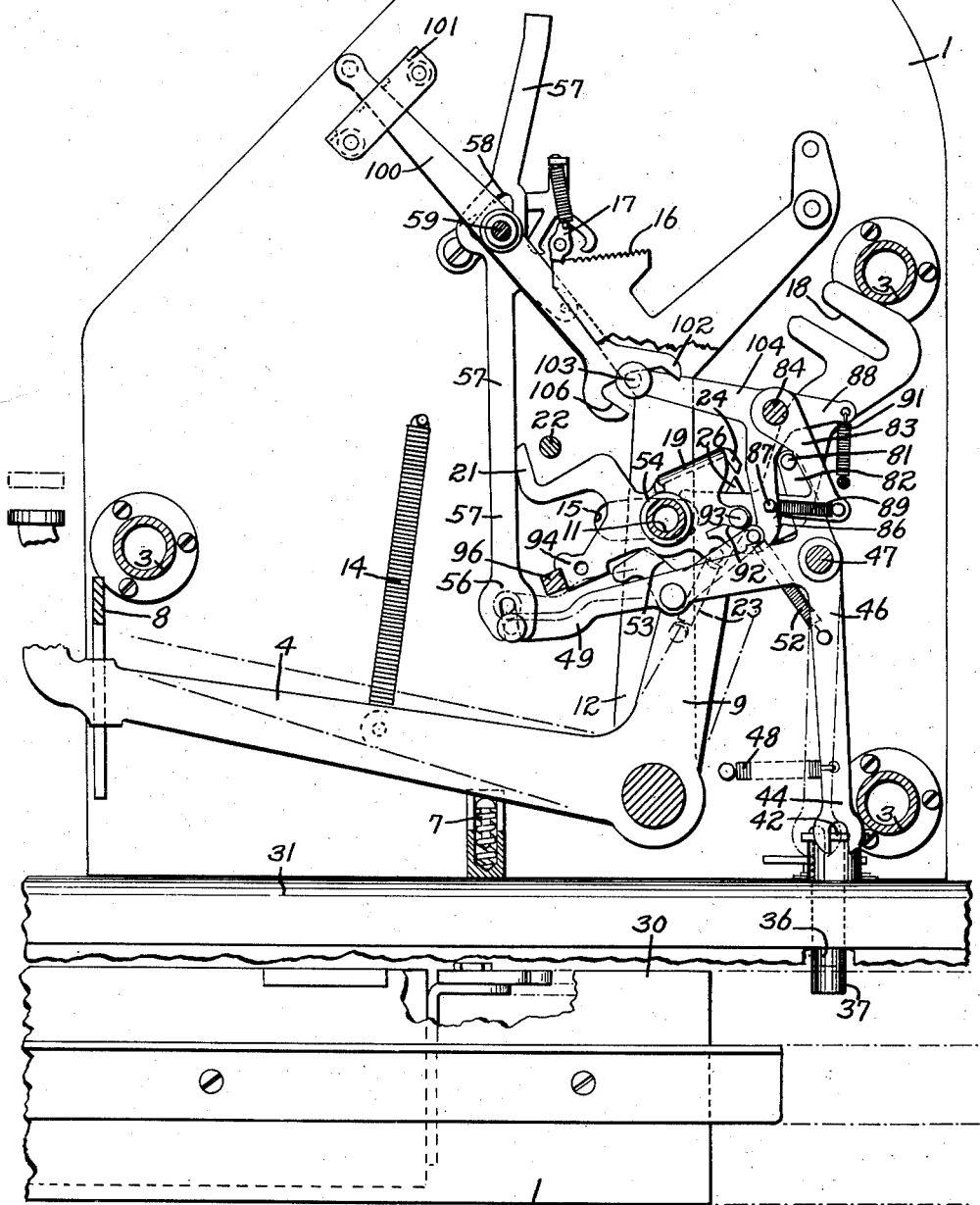

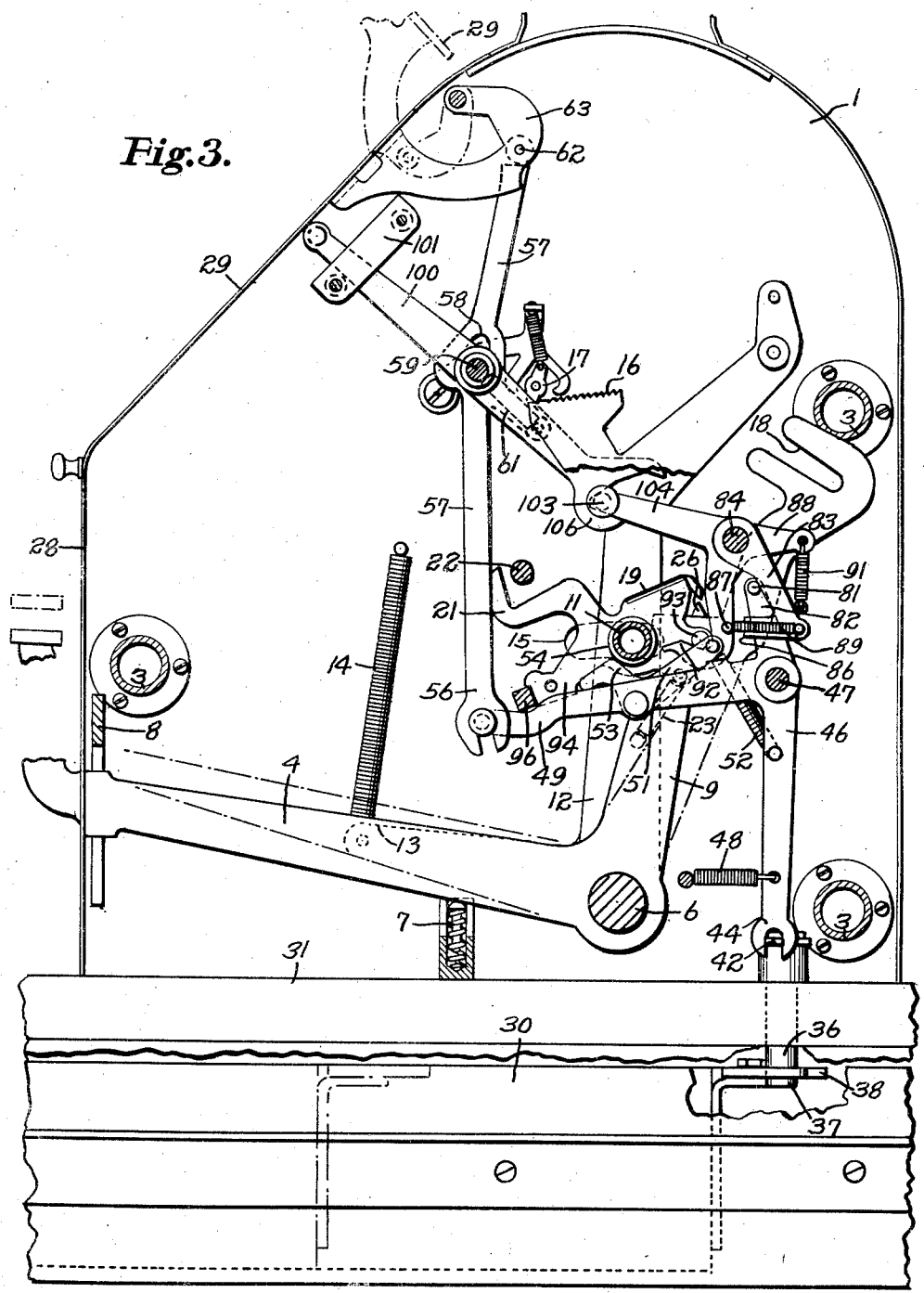

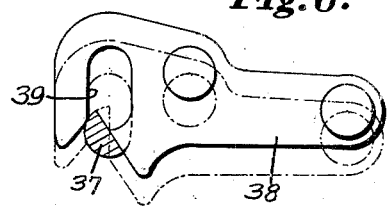
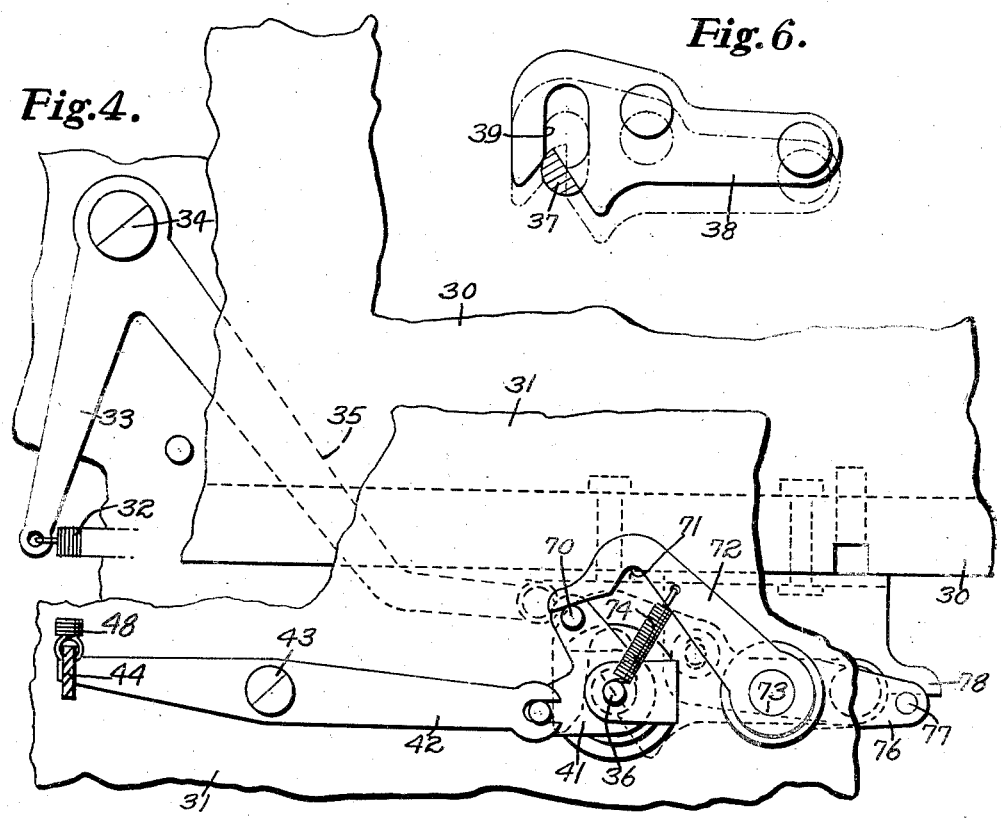
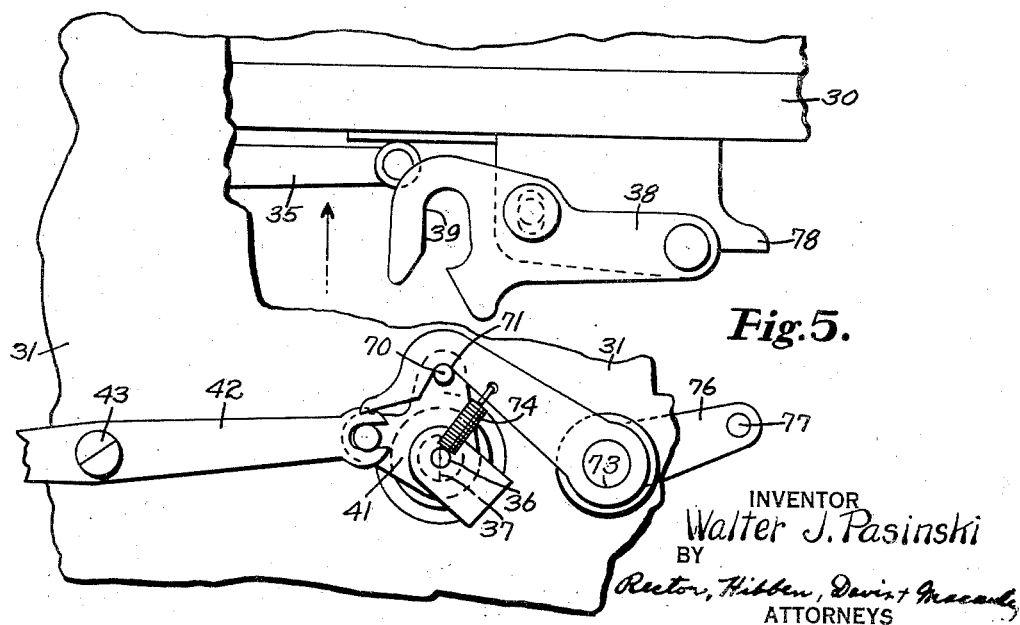

Feb. 9, 1937.  W. J. PASINSKI  2,070,063
CASH REGISTER
Filed Sept. 15, 1933    5 Sheets-Sheet 5

INVENTOR
Walter J. Pasinski
BY
Rector, Hibben, Davis + Macauley
ATTORNEYS

Patented Feb. 9, 1937

2,070,063

UNITED STATES PATENT OFFICE 2,070,063

CASH REGISTER

Walter J. Pasinski, Howell, Mich., assignor to Burroughs Adding Machine Company, Detroit, Mich, a corporation of Michigan Application September 15, 1933, Serial No. 689,661

12 Claims. (Cl. 235—130)

This invention relates to cash registers and is more particularly concerned with means for controlling the operation of the cash register mechanism and cash drawer.

It is desirable to vary the operating conditions of a cash register to meet varying uses and periods of use. Where a proprietor is using a cash register it is not necessary that the cash drawer be closed after each transaction to enforce a record being made each time a key is depressed whereas it is desirable to do so when a subordinate is using the register. On the other hand at certain rush periods it may be more convenient to permit operation of the cash register keys to enter amounts therein without requiring closing of the cash drawer after each key depression, or transaction regardless of who is using the cash register. At the end of the day, or if the register is to be temporarily cut of service, it is desirable to lock the cash register against all operations.

One or more controlling means are usually employed to control the operating conditions of the register to suit the occasion and generally are concealed and enclosed by a hinged panel forming part of the exterior casing of the cash register. It has been proposed to use a unitary or single control lever for controlling all operating conditions of the cash register, including opening of the cash drawer when desired. This arrangement, however, has the disadvantage that it requires an extra manipulation on the part of the operator to open the cash drawer. It has also been proposed to use a single control lever movable to three positions to either lock the entire register, permit operation without enforcing closing of the drawer, or to enforce closing of the cash drawer after each transaction; and to employ a separate control lever for opening the cash drawer. This arrangement also requires an extra operation by the operator.

Having in mind the disadvantages of the foregoing and other proposed constructions it is an object of this invention to provide an improved cash register.

It is also an object of this invention to provide an improved controlling means for locking the cash register against operation, enforcing closing of the cash drawer after each complete entry, or permitting operation of the cash register independently of the position of the cash drawer.

It is still another object of this invention to provide a new combination of controls for the cash register and the cash drawer thereof.

Other objects of this invention will be apparent from the following description given in connection with the drawings in which:

Fig. 2 is a similar view with the control lever in center or "closed position" and with the machine partly operated or in preset condition with the cash drawer left open from a previous operation.

Fig. 3 is a similar view with the control lever in lower or "locked position" and the machine in partially rocked or preset condition, this condition being the farthest a key can be moved under the circumstances and also illustrating the hinged cover control of the drawer latch.

Fig. 4 is a partial plan view of the rear end of the cash drawer and latching mechanism therefor illustrating the drawer in latched position.

Fig. 5 is a similar view showing the cash drawer released and in open position.

Fig. 6 is a plan detail of the cash drawer latch; and

Cash register mechanism

Figure 1:
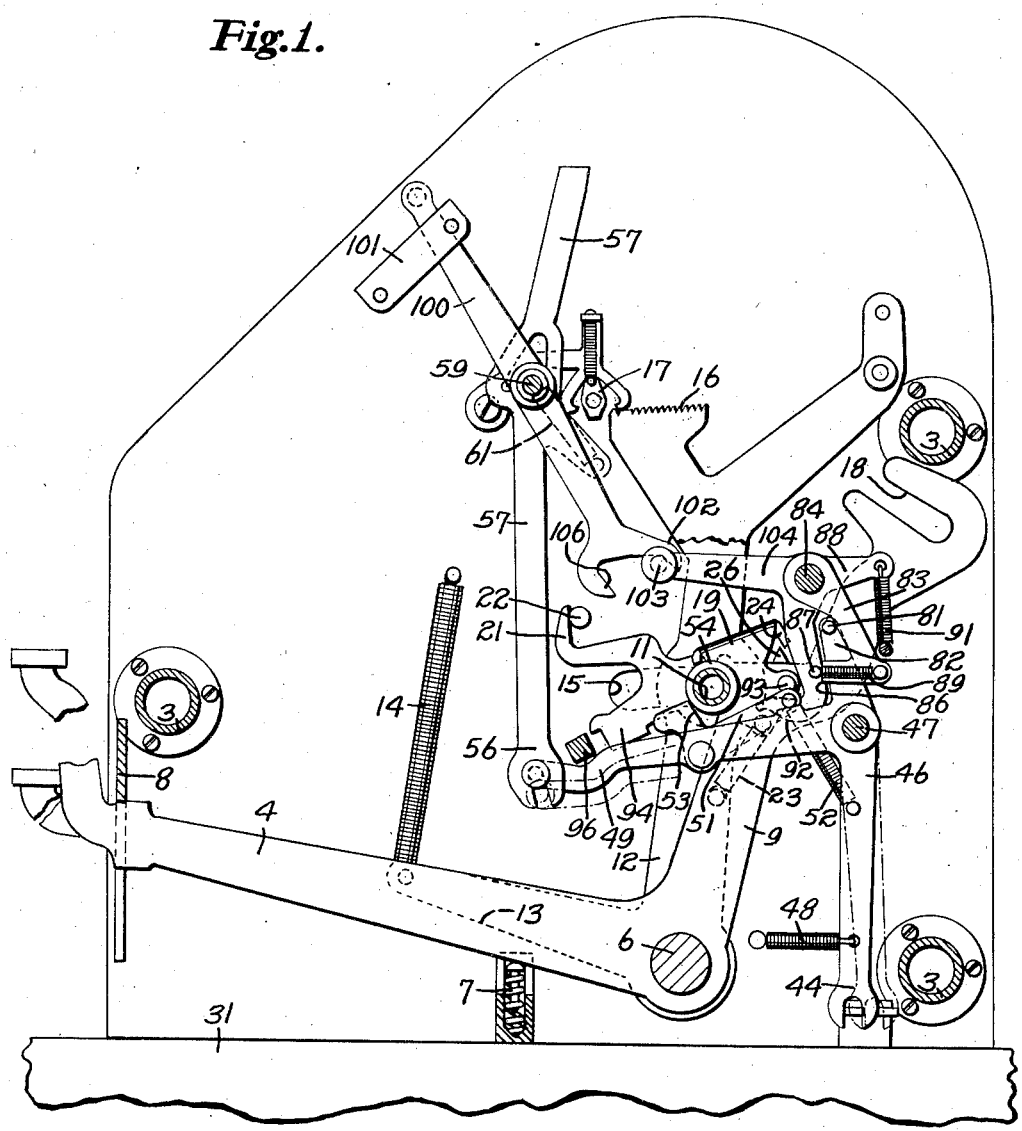
Figure 1 is a right side elevation of certain operating and control elements of the machine, the latter being in normal position and the control lever being in upper or "open position".

The present machine is known as a key operated cash register and the mechanism instead of being mounted within a cast frame is mounted and carried between right and left side plates 1 which support the entire mechanism and are maintained in spaced relation by tubular members 3 and various shafts of the cash register mechanism. This construction not only facilitates assembly inspection and repair of the machine but reduces weight and also cost of production. The mechanism includes two rows of depressible key levers 4 of the necessary denomination and numbers in each denomination. The key levers are journaled on a cross shaft 6 secured to end plates 1 and are urged clockwise about shaft 6 by springs 7, the upward movement of the key levers being limited by a comb plate 8. Each key has a rearwardly and an upwardly extending arm 9 which engages a hollow cross shaft 11 carried at each end by one arm of a full stroke lever 12 secured to shaft 6 adjacent each end thereof. Levers 12 have horizontal arms 13 to which are secured tension springs 14 which urge the levers 12 clockwise (Fig. 1).

Shaft 11 extends through slots 15 in the end plates 1 which slots limit the rocking movement of shaft 11 and levers 12 constituting a universal bail. The full stroke levers 12 terminate in their upper ends in sectors 16 engaged by pawls 17 which insure a full stroke being made each time levers 12 are rocked by the keys. The upper end of each key lever has a differential cam slot 18 therein which differentially actuates the registers and the indicating mechanisms not shown.

Shaft 11 also supports for bodily movement therewith a key coupler 19 freely pivoted thereon and having an upwardly extending finger 21 normally urged into contact with a stud 22 by means of a spring 23, in which position the coupler is inoperative. Upon partial depression of any key the forward movement of shaft 11 carrying with it coupler 19 permits clockwise rotation of the coupler about its pivot by its spring to present its downwardly extending lip 24 into the path of movement of projections 26 extending from each of the keys whereby the keys may be coupled or latched to the key coupler. Upon further depression of any one key all latched keys are carried downwardly because of the bodily movement of the coupler with the depressed key. The foregoing mechanism is made the subject matter of my copending applications Serial Nos. 689,656 and 689,657, filed September 15, 1933, to which reference is made for further details.

Casing

Figure 7:
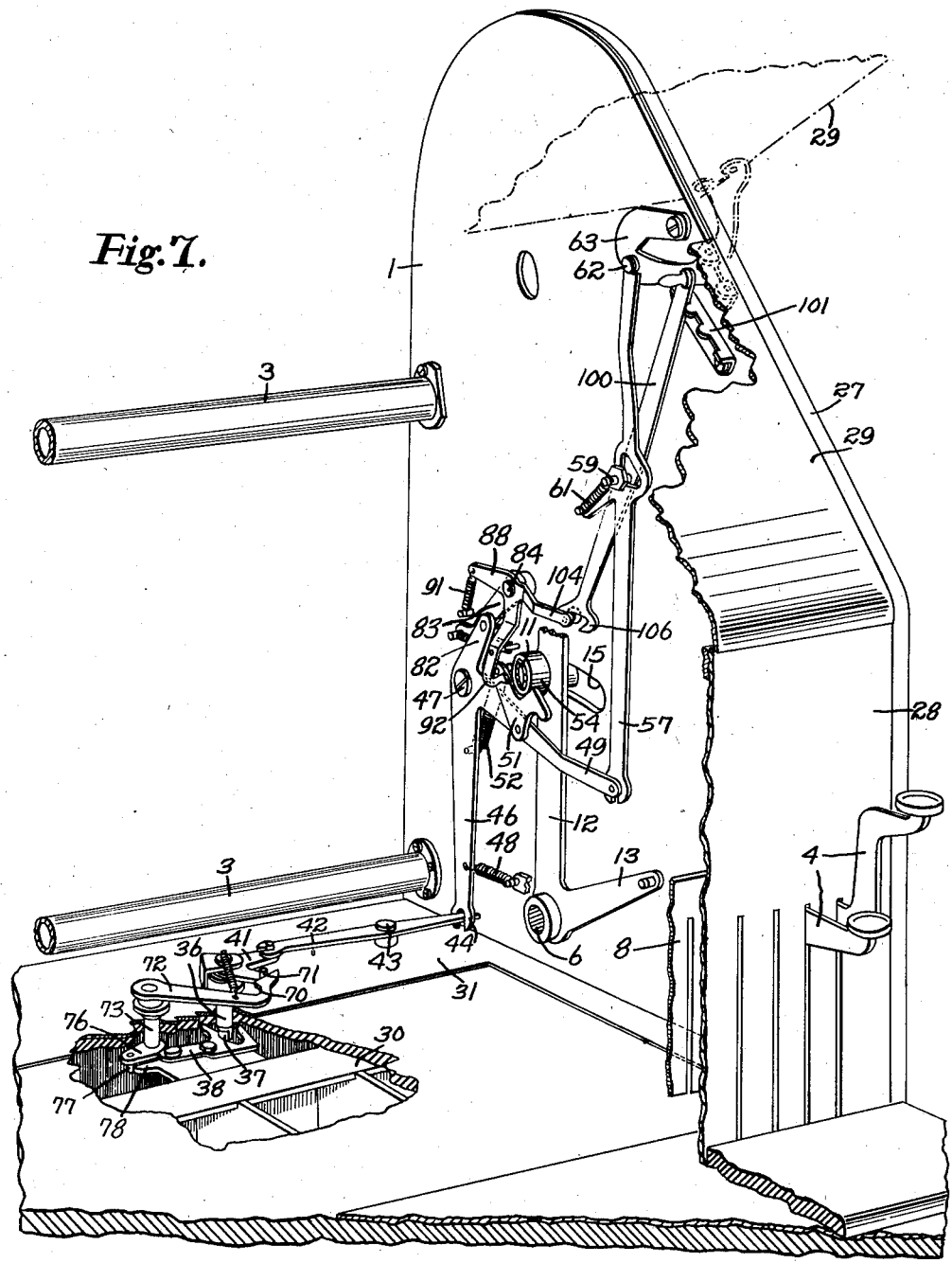
Fig. 7 is a perspective view taken from the interior of a portion of the cash register and illustrating the control lever and associated mechanism in normal position, the control lever being in upper or "open position".

The entire cash register mechanism is enclosed in a sectionalized casing secured to the side frames 1 comprising in part two side panels 27 (Fig. 7) which are similar except that one is for the right side and one is for the left side, a lower front panel 28 and an upper hinged front panel 29 which latter panel may be locked in closed position by a key lock not shown. The latter panel serves to conceal and enclose the various item counters usually used in machines of this type, the control lever for varying the operating conditions of the machine, and the totalizing registers. The casing construction is made the subject matter of my copending application Serial No. 689,662, filed September 15, 1933, to which reference is made for further details.

Cash drawer

The cash register mechanism is mounted on top of a cash drawer 30 which is enclosed in a separate cash drawer housing 31 to which the end plates 1 are secured. The cash drawer is arranged to be opened by the cash register mechanism and also by opening hinged lid 29 as will be later explained. The cash drawer is normally urged to open position by means of a spring 32 acting upon one arm 33 of a crank lever pivoted at 34 (Fig. 4) to the drawer housing and having its other arm 35 engaging the rear end of the cash drawer.

Cash drawer latch

The cash drawer is normally held in closed position in its housing by a latch post 36 having a lower half round portion 37 engageable with a latch plate 38 having a latching slot 39 with a restricted opening which permits entry of the half round end 37 when turned in one direction and prevents passage therethrough when turned in the other direction to present its full diameter thereto, the two positions being shown in Figs. 4 and 5 and in full and dotted lines in Fig. 6.

Post 36 with its half round portion 37 is rotated by means of a crank plate 41 secured to the upper end of the post having a pin connection with one end of a lever 42 pivoted at 43 to the housing. The other end of lever 42 is engaged by the lower forked end 44 of a crank arm 46 pivoted at 47 to one end plate and is normally urged clockwise (Fig. 1) by a spring 48 in which position the cash drawer is latched in closed position. The cash drawer latch mechanism is made the subject matter of my copending application Serial No. 689,664, filed September 15, 1933, to which reference is made for further details.

Cash register control of cash drawer

Crank arm 46 may be rocked by either the hinged cover or the cash register mechanism to rock shaft 36 to thereby control opening of the cash drawer. For this purpose crank 46 is provided with a forwardly projecting arm 49 to which is pivoted a passby pawl 51 urged clockwise by a spring 52 to maintain the upstanding nose 53 of the pawl in contact with a spacing collar 54 on shaft 11. Upon forward movement of shaft 11 caused by depression of a key lever, collar 54 will engage nose 53 of passby pawl 51 and rock the latter counterclockwise until the nose 53 passes under and clears collar 54. Upon return movement of shaft 11, collar 54 will engage nose 53 of pawl 51, and pawl 51 being unable to rock clockwise about its pivot, will cause a downward rocking of arm 49 of crank 46 and a consequent oscillation of shaft 36 to released position, whereby the cash drawer is permitted to be opened by its spring.

Hinged cover control of cash drawer

In order that raising of the hinged cover 29 will release the drawer latch the forward end of arm 49 of crank 46 is connected to the forked lower end 56 of a link 57. Link 57 has a triangular opening 58 therethrough which engages a stud 59 projecting inwardly from the right end plate 1, and is normally urged to upper position by a spring 61. The upper end of link 57 lies in the path of a stud 62 carried by one of the hinge leaves 63 supporting the hinged cover 29, the pin 62 and the hinged leaf 63 being so arranged as to force the link 57 downwardly upon opening of the hinged cover. Downward movement of link 57 rocks crank 46 and shaft 36 to released position whereby the cash drawer is opened by its spring.

It follows from the foregoing that by actuating the single crank 46 from either of two sources the cash drawer is controlled. That is, the drawer is opened by either the cash register mechanism upon the return movement of the key levers 4 or by opening the hinged cover 29 which conceals and encloses the control levers and the totalizing registers which will later appear. The latter manner of opening the cash drawer by an authorized person having a key to the cover eliminates the necessity of any other manipulations to open the drawer.

Latch detent

The drawer latch shaft 36 is retained in open position, by a stud 70 carried by the other arm of plate 41 engaging a notch 71 (Figs. 4 and 5) formed in a detent 72 secured to a shaft 73 and urged counterclockwise by a spring 74. The lower end of shaft 73 has an arm 76 secured thereto carrying a stud 77 positioned to be engaged by a lug 78 carried by the cash drawer when the latter is closed. Consequently when the cash drawer is closed, lug 78 contacts lug 77 and thereby rocks detent 72 clockwise releasing pin 70 and thereby shaft 36 which through spring 48 (Fig. 1) is returned to locked position. The detent 72 and its associated mechanisms are not necessary insofar as the latching of the cash drawer is concerned, but are the means by which key depression is normally prevented as long as the cash drawer remains open as will later appear.

Enforced closing of cash drawer

It is usually desirable to enforce the reclosing of the cash drawer after each transaction, so that an indication must be made each time access to the cash drawer is had. For this purpose crank 46 is utilized as will be seen more particularly from Fig. 2 in which the machine is shown in locked position, such as it would assume if an attempt were made to operate the cash register with the drawer in open position.

When the cash drawer is in open position shaft 37 is held in rocked or unlatched position by detent 72 and accordingly crank 46 is held in its counterclockwise position as indicated in full lines in Fig. 2.

As crank 46 assumes this position a stud 81 carried by an upwardly extending arm 82 of crank 46 moves forward counter clockwise and is followed by clockwise movement of the lever 83 pivoted on a stud 84 extending inwardly from the right hand end plate 1. The lever 83 is normally limited against clockwise rotation by the pin 81. This movement of the lever 83 causes its forwardly extending finger 86 to engage a stud 87 carried by a crank 88 also pivoted about stud 84 and rocked clockwise thereabout by a spring 91. The lever 83 and crank 88 are normally yieldingly connected together by a spring 89 which is stronger than spring 91. Accordingly, lever 83 and crank 88 move together as a unit when the pin 81 moves forward. When lever 83 and crank 88 are permitted to be rocked clockwise by retraction of stud 81, as occurs when the cash drawer is opened during a previous machine operation, a forwardly extending hooked arm 92 of crank 88 moves into contact with the under side of stud 93 carried by an arm of the coupler 19 and prevents clockwise rocking of the coupler about its pivot 11 beyond its present condition.

By limiting the clockwise rocking of coupler 19 about its pivot 11 the forwardly extending lugs 94 thereof engage fixed square studs 96 projecting inwardly from both end plates, thus preventing further forward bodily movement of the coupler and shaft 11 beyond preset position. The coupler is locked against return movement by the full stroke pawls 17 engaging the full stroke racks 16. The machine is therefore locked in preset condition against further depression of the key levers by engagement of lugs 94 with studs 96 and against return movement by the pawl 17 and full stroke rack 16.

Therefore the key levers cannot be depressed beyond preset condition until the cash drawer is closed, to release shaft 37 and crank arm 46, the latter of which when released and under action of its spring 48 rocks clockwise to retract lever 83 and crank 88, thus withdrawing the hooked arm 92 of lever 88 out of the path of movement of stud 93, and permitting full operation of the machine.

Open cash drawer operation

In some uses and particularly during rush periods it is desirable to disable the enforced closing of the cash drawer and permit operation of the cash register keys regardless of the position of the cash drawer, so that the cash register may be repeatedly operated without having to close the cash drawer. Means are therefore provided for disabling the locking action of the hooked arm 92. For this purpose a control lever 100 is employed, the lever terminating in a handle extending upwardly and forwardly to a concealed position beneath the hinged cover where it engages a detent 101 which yieldingly retains the lever in selected position. Handle 100 is pivoted to stud 59 and is provided at its lower end with a rearwardly and downwardly projecting finger 102. When lever 100 is in its central position as shown in Fig. 2, its rearwardly extending finger 102 is inoperative.

When the lever is moved to its upper position, or what is termed its "open position" as shown in Fig. 1, finger 102 engages a stud 103 projecting laterally from a forwardly extending arm 104 of crank 88 and rocks the latter crank counterclockwise against the action of spring 91 so that its lower hooked arm 92 cannot engage under pin 93 projecting from key coupler 19 and therefore cannot lock the key coupler regardless of the position of the latching shaft of the cash drawer. Therefore with lever 100 in its upper or "open position" (Fig. 1) the cash register key levers can be depressed and the cash register operated regardless of the position of the drawer.

Locked register position

It is also desirable to control the machine so as to lock both the keys against depression and the cash drawer against opening. For this purpose control lever 100 is provided with a forward and downwardly projecting finger 106 which when the control lever is moved to its lower or locked position, as shown in Fig. 3, engages stud 103 on arm 104 of crank 88 and rocks the latter clockwise about pivot 84 to move the hooked arm 92 under stud 93 of the coupler to prevent depression of the keys beyond preset position as previously explained.

It will be understood that in moving the control lever to lower or latched position and in rocking crank 88 clockwise spring 89 provides the necessary yielding connection with the crank arm 88 and the lever 83.

Inasmuch as the cash drawer is not normally opened until the return of a depressed key it follows that the cash drawer is also locked in closed position when the keys are locked against depression beyond preset position.

It is sometimes desirable to fully lock a machine with the cash drawer open after business hours to prevent burglars from damaging it in their efforts to open the cash drawer to ascertain if it contains any money. This may be accomplished if desired by opening the drawer through raising the hinged cover or by depressing a key and then moving the control lever 100 to locked position and lowering and locking the hinged cover in closed position.

Summary

From the foregoing description it will be apparent that the cash drawer may be released either by raising the hinged cover or by full depression and release of a key lever through the common crank 46 which crank also in part controls enforcement of drawer closing prior to operating the machine. This enforcement is accomplished by limiting the coupler against rotation which in turn blocks it against bodily movement. Furthermore, the control of the machine from so-called closed to open operation is obtained through actuation of a common crank 88 yieldably connected to lever 83. Also, a single limiting device is used to limit rocking of the coupler about its pivot for all occasions and a pair of blocking lugs and studs are used for restricting bodily movement of the universal bail. The control lever, on the other hand, does not control opening of the cash drawer which is done independently and automatically through raising of the hinged cover, thereby eliminating a manual operation which is otherwise necessary by the operator.

The arrangement of control elements is such that no lock is necessary to retain the control lever in selected position, a mere detent being all that is necessary. Prevention of unauthorized operation of the lever is obtained by locking the hinged cover. No additional load is placed on the keys by the control lever and associated mechanisms because the coupler is merely released for operation by depression of the keys rather than being moved into operation by the keys.

Other novel features and their resultant advantages will be apparent to those skilled in the art to whom it will also appear that minor changes may be made in the details of construction without departing from the spirit and scope of this invention as defined in the appended claims.

I claim:

1. In a cash register having depressible pivoted key levers, a pivoted key coupler normally urged toward coupling position, means for normally retaining said coupler in inoperative position, said coupler being releasable to move into operative position upon depression of a key lever, means for arresting pivotal movement of said coupler, and a control lever for selectively controlling said arresting means.

2. In a cash register having depressible pivoted key levers, a pivoted key coupler normally urged toward coupling position, means for normally retaining said coupler in inoperative position, said coupler being releasable to move into operative position upon depression of a key lever, means movable to arrest pivotal movement of said coupler to prevent further depression of said keys beyond latching position, and a control lever for selectively disabling said arresting means.

3. In a cash register having depressible pivoted key levers, a key coupler mounted for pivotal and bodily movement and adapted to be moved bodily upon depression of said key levers; a stop for limiting bodily movement of said coupler, means for causing said coupler to engage said stop when moved by said key levers, and a control lever in addition to said key levers for selectively actuating said latter means.

4. In a cash register having depressible key levers, a pivoted key coupler, said coupler and its pivot being bodily movable by said keys, means for restricting bodily movement of said coupler, means for limiting pivotal movement of said coupler to cause said restricting means to become effective, and a lever movable independently of said key levers for selectively controlling said limiting means.

5. In a cash register having depressible pivoted key levers, a pivoted key coupler controlled thereby, a cash drawer controlled by said keys, means engaging said coupler to limit movement of the latter when the drawer is open, and a control lever movable to a position to disable said means, to a second position to permit operation of said means, and to a third position to operate said means regardless of the position of said cash drawer.

6. In a cash register having depressible pivoted key levers, a pivoted key coupler controlled thereby, a cash drawer, a latch for securing said drawer in closed position, a pivoted member for releasing said latch, connections between said member and said keys for actuating said member to release said drawer, means controlled by said member for restricting movement of said keys when said drawer is open, a control lever for selectively disabling said latter means when said drawer is open, and additional means manually operable for actuating said member to release said drawer.

7. In a cash register having depressible pivoted key levers, a pivoted key coupler controlled thereby, a cash drawer, a latch for securing said drawer in closed position, a pivoted member for releasing said latch, connections between said member and said keys for actuating said member to release said drawer, means controlled by said member for restricting movement of said keys when said drawer is open, a control lever for selectively disabling said latter means when said drawer is open, a hinged cover for concealing said lever, and means operable by said cover to actuate said member to release said drawer.

8. In a cash register having depressible pivoted key levers, a pivoted key coupler controlled thereby, a cash drawer, a latch for securing said drawer in closed position, a pivoted member for releasing said latch, connections between said member and said keys for actuating said member to release said drawer, means controlled by said member for restricting movement of said keys when said drawer is open, and a control lever selectively movable to one position to disable said latter means when said drawer is open, to a second position to permit operation of said means, and to a third position to actuate said means.

9. In a cash register having depressible pivoted key levers, a pivoted key coupler controlled thereby, a cash drawer, a latch for securing said drawer in closed position, a pivoted member for releasing said latch, connections between said member and said keys for actuating said member to release said drawer, means controlled by said member for restricting movement of said keys when said drawer is open, a control lever selectively movable to one position to disable said latter means when said drawer is open, to a second position to permit operation of said means, and to a third position to actuate said means, and independent means for actuating said member to release said drawer.

10. In a cash register having depressible pivoted key levers, a pivoted key coupler controlled thereby, a cash drawer, a latch for securing said drawer in closed position, a pivoted member for releasing said latch, connections between said member and said keys for actuating said member to release said drawer, means controlled by said member for restricting movement of said keys when said drawer is open, a control lever selectively movable to one position to disable said latter means when said drawer is open, to a second position to permit operation of said means, and to a third position to actuate said means, a hinged cover for concealing said lever, and means operable by said cover to actuate said member to release said drawer.

11. In a cash register having depressible pivoted key levers, a key coupler mounted for bodily movement by said keys, and pivotal movement to latch said keys thereto, means normally retaining said coupler in inoperative position, said coupler being releasable to move about its pivot into operative position upon depression of a key lever, means for arresting pivotal movement of said coupler and a control lever for selectively controlling said arresting means.

12. In a cash register having depressible pivoted key levers, a key coupler mounted for bodily movement by said keys, and for pivotal movement to latch said keys thereto, means normally retaining said coupler in inoperative position, said coupler being releasable to move about its pivot into operative position upon depression of a key lever, means for arresting movement of said coupler and a control lever for selectively controlling said arresting means.

WALTER J. PASINSKI.